United States Patent [19]

Linville

[11] 4,422,812

[45] Dec. 27, 1983

[54] ROTATABLE SHELL CUTTER

[76] Inventor: Kevin D. Linville, 6257 Sturm Rd., Huntington, W. Va. 25705

[21] Appl. No.: 324,993

[22] Filed: Nov. 25, 1981

[51] Int. Cl.³ .............................................. B23B 27/10
[52] U.S. Cl. ..................... 408/204; 408/207; 408/104; 408/713; 407/46; 407/48; 407/101; 407/103
[58] Field of Search ...................... 408/203.5, 204, 201, 408/206, 203, 207, 208, 223, 209, 224, 145, 713, 103–109; 407/46, 47, 48, 101, 102, 103, 108, 109, 112

[56] References Cited

U.S. PATENT DOCUMENTS

| | | | |
|---|---|---|---|
| 563,488 | 0/1896 | Howe . | |
| 3,308,689 | 3/1967 | MacDonald | 408/204 |
| 3,430,526 | 3/1969 | Valenziano | 408/204 |
| 3,548,687 | 12/1970 | Holloway | 408/206 |
| 3,610,768 | 10/1971 | Cochran | 408/204 |
| 3,774,276 | 11/1973 | Eckle | 407/101 |
| 3,887,974 | 6/1975 | Sorice | 407/113 |
| 4,057,357 | 11/1977 | Daghe et al. . | |
| 4,101,238 | 7/1978 | Reibetanz et al. | 408/59 |
| 4,118,138 | 10/1978 | Takacs et al. | 407/101 |
| 4,137,000 | 1/1979 | Takacs et al. | 407/101 |
| 4,208,154 | 6/1980 | Gundy | 408/204 |
| 4,209,047 | 6/1980 | Weill | 407/48 |

FOREIGN PATENT DOCUMENTS 620848 12/1980 Switzerland ........................ 407/112

Primary Examiner—Leonidas Vlachos
Assistant Examiner—Jerry Kearns
Attorney, Agent, or Firm—Larson and Taylor

[57] ABSTRACT

A rotatable shell cutter has a cylindrical member which advances to cut into a pipe. A plurality of cutting elements are arranged in a circle at one end of the cylinder. Each cutting assembly comprises a cartridge fixed as one piece to the cylindrical member, such as by brazing or the like, a seat positioned thereon through dowel pins, a cutting insert mounted on the seat through a cooperating V-shaped projection and recess, and a clamp engaging, positioning and securing the cutting element against the seat and also secured to the cartridge for urging all of the cutting assembly elements together.

12 Claims, 14 Drawing Figures

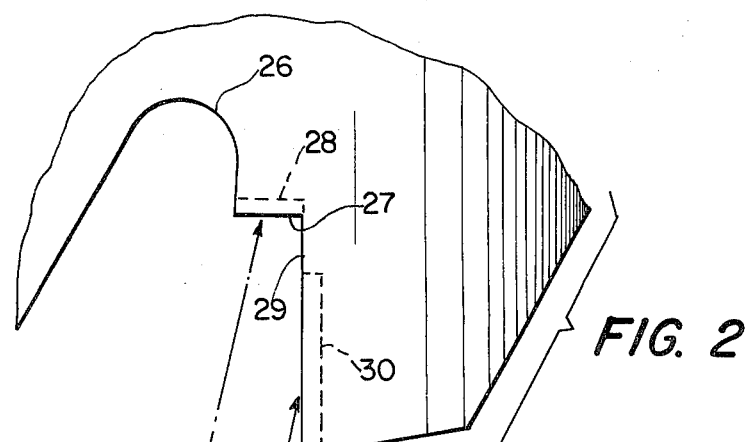
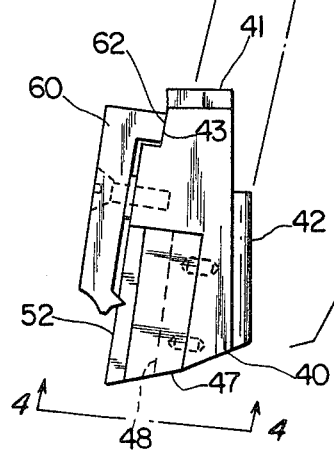
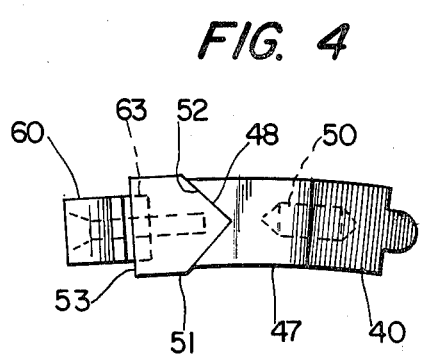
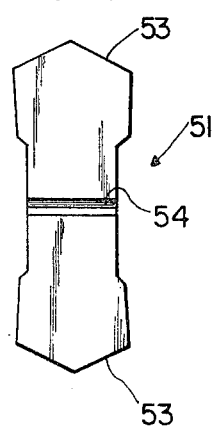
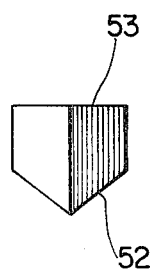
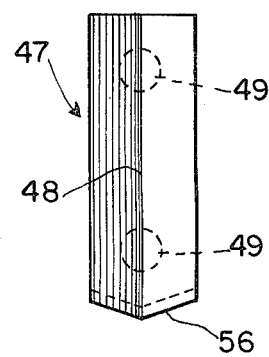

ROTATABLE SHELL CUTTER

BACKGROUND OF THE INVENTION

This invention relates to shell cutters, and in particular it relates to a shell cutter having new and improved cutting assemblies.

Shell cutters are known for cutting holes into existing pipelines, at a direction perpendicular to the existing pipeline, for the purpose of attaching an additional perpendicular pipeline onto the existing pipeline. An example of a previously known shell cutter of this general type is shown in the Howe U.S. Pat. No. 563,488, issued July 7, 1896. The Daghe et al U.S. Pat. No. 4,057,357, issued Nov. 8, 1977, shows a shell cutter of this general type but adapted especially for cutting plastic pipe.

A shell cutter adapted for use on all pipeline materials, including plastic, steel or cast iron, must of course be sufficiently strong for cutting the latter. Moreover, it is important that such a shell cutter have a plurality of cutting teeth so that the cutting action is balanced. Heretofore, in a shell cutter having a plurality of teeth and suitable for heavy duty use on pipes made of steel, cast iron or the like, the cutting teeth have been carbide teeth which have been brazed directly onto the end of the rotating cylinder which forms the body of the shell cutter. When the carbide teeth become broken or dulled, the entire cutter must be taken off of the machine and taken to a repair shop whereat all of the teeth must be replaced. The teeth are then ground on the inside diameter, the outside diameter, and on the top, and the proper cutting clearance is provided on the front of the cutter so it can be used again. This procedure is not only expensive, but it is quite time consuming, often taking several days. Hence, the operator must either delay the pipe cutting job for several days or invest in a backup cutting device. Either alternative involves additional costs.

Hence, there exists a need for a multi-toothed, heavy duty shell cutter wherein the above noted disadvantages are overcome.

BRIEF SUMMARY OF THE INVENTION

Hence, it is a purpose of the present invention to provide a new and improved shell cutter of the present type which overcomes the disadvantages of previously known shell cutters.

This purpose is achieved in accordance with the present invention by providing new cutting assemblies having teeth, or "cutting inserts", which are removably mounted on the cutter housing, held securely thereon when in use, and so constructed that if a force is transmitted to the cutting assembly of a magnitude sufficient to break the cutting insert, such force will not be conveyed to that part of the assembly which is integrally fixed to the cutter housing.

In accordance with a preferred arrangement of the cutting assembly, a first member, referred to as a "cartridge", is integrally secured to the cutter housing, such as by brazing or the like, to form one piece therewith. A seat is removably attached to and positively positioned on the cartridge. The cutting insert is in turn removably attached to and positively positioned on the seat. A clamp then secures the cutting insert and seat together and to the cartridge.

Although different means may be provided for connecting together the individual components of the cutting assembly, in a preferred arrangement the seat is positioned on the cartridge by means of dowels which fit into mating recesses in both the cartridge and the seat. The seat is preferably formed on its side opposite from the cartridge with a V-shaped groove, and the cutting insert is then provided with a matching V-shaped bottom which is received in the groove of the seat. The cutting insert is preferably a pre-ground tungsten carbide tooth and preferably it has cutting edges at both ends so that it is indexible, i.e. reversible longitudinally so that both ends can be used in cutting operations so that the cutting insert need not be replaced until both ends have been used. Preferably the side of the cutting insert facing away from the seat has a groove formed therein which receives a projection of a clamp which urges the cutting insert against the seat, and both against the cartridge, the clamp preferably being secured by screws or the like directly to the cartridge. The cartridge preferably has raised studs which fit into corresponding grooves in the cutter housing to facilitate brazing of the cartridge to the cutter housing. It is preferred that the sides of the cartridge and seat be cured along concentric circles coincident with the axis of rotation of the cutter housing as this will place the cutting edge of the cutting insert in the correct plane, i.e. a plane passing through the said axis of rotation. With the cutting insert in this position, the full width of the cutting insert will absorb the shock of the cut. This will produce a better cutting action and prolong the life of the cutting insert. Additionally, with this arrangement drag and binding of the cutting assembly passing through the material of the pipe being cut will be minimized, With the new and improved shell cutter of the present invention, having the improved cutter assemblies, several advantages are achieved. Firstly, since the cutting inserts are themselves mounted on removable elements, i.e. the seats, and since the force sufficient to break a cutting element is often sufficient to break the element on which it is mounted, in the present invention any force sufficient to break a cutting insert will be transmitted to the removable seat but not to the cartridge, so that only removable elements will be damaged. Secondly, upon breakage or dulling of the cutting inserts to the point where they will not cut, with the present invention the machine operator can easily remove the broken or dulled teeth in minutes at the job site, thus avoiding the need to take the entire shell cutter away to a machine shop to effect the necessary repairs. Rather, with the present invention new, pre-ground teeth can be inserted in minutes directly at the job site. The costs associated with extensive down time or spare shell cutters are eliminated. Additional cost savings are effected because the teeth are indexible so that as they wear down they can be reversed, deferring replacement until every other dulling cycle.

Hence, it is an object of the present invention to provide a new and improved shell cutter having improved cutting assemblies.

It is still another object of the present invention to provide a new and improved shell cutter of the type described, wherein breakage of a cutting insert is not transmitted to parts of the cutting assembly integrally secured as one piece with the cutter housing.

It is still another object of the present invention to provide a new and improved shell cutter of the type described wherein damaged or dulled teeth can be changed in minutes at the job site, thus eliminating the need for expensive down time or spare shell cutters.

It is still another object of the present invention to provide a new and improved shell cutter wherein the mounting elements of the cutting assembly are formed with curved sides lying in concentric circles having their axis coincident with the axis of the shell cutter to most effectively transmit the force of the cutting action to the cutting inserts and to minimize drag and binding during the cutting procedure.

It is still another object of the present invention to provide a new and improved shell cutter having an improved cutting assembly comprising a cartridge member fixed as one piece such as by brazing or the like to the cutter housing, a seat removably secured to the cartridge, a cutting insert removably secured to the seat, and a clamp for holding the cutting insert to the seat and both of these elements to the cartridge.

These and other objects of the present invention will become more apparent from the detailed description to follow, taken together with the accompanying drawings.

BRIEF DESCRIPTION OF THE DRAWINGS

There follows a detailed description of preferred embodiments of the present invention which are to be read together with the accompanying drawings wherein:

FIG. 2 is an enlarged side elevational view of a portion of FIG. 1, showing the cutting assembly separated from the cutter housing for purposes of clarity.

FIG. 4 is a bottom view of the cutting element of FIG. 2, taken along line 4—4 of FIG. 2.

FIG. 6 is a top view of a cutting insert, taken along line 6—6 of FIG. 3.

FIG. 7 is an end view of the cutting insert, taken along line 7—7 of FIG. 3.

FIG. 8 is a top view of a seat, taken along line 8—8 of FIG. 3.

DETAILED DESCRIPTION OF THE PREFERRED EMBODIMENTS

Figure 1:
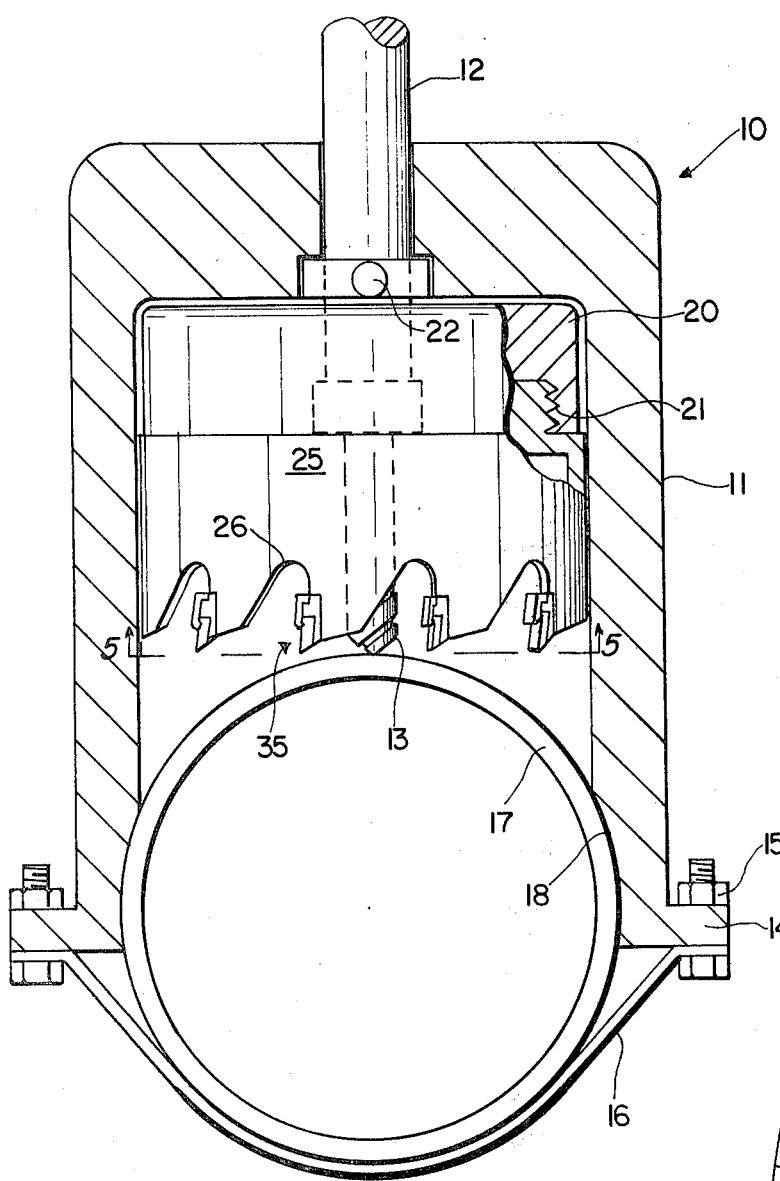
FIG. 1 is a central cross sectional view through a shell cutter having the features of the present invention and mounted on a pipe to be cut.
Figure 5:
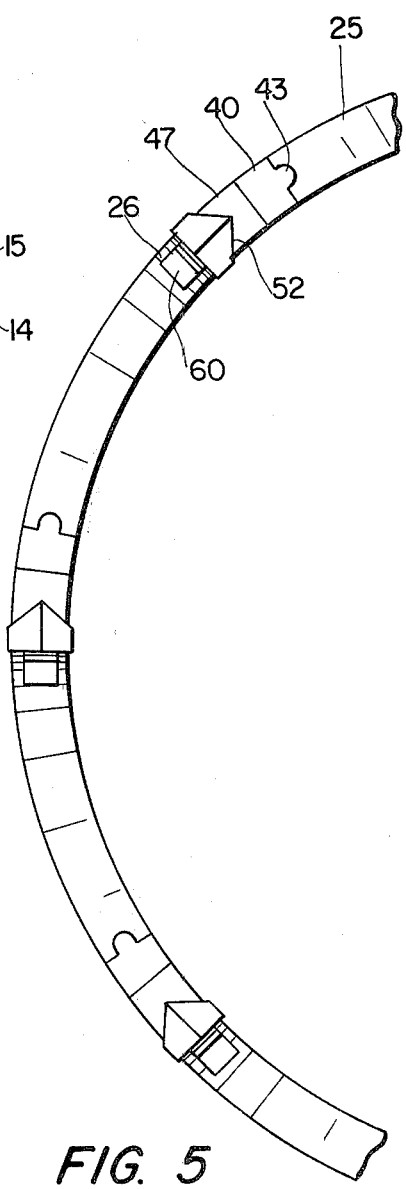
FIG. 5 is a partial sectional view taken in the plane of line 5—5 of FIG. 1.

Referring now to the drawings, like elements are represented by like numerals throughout the several views.

Referring to FIG. 1, there is shown a shell cutter 10 constructed in accordance with the present invention.

A stationary housing 11 includes a shaft 12 of a portable drilling machine extending therethrough and terminating at a drill bit 13. Flanges 14 on the stationary housing 11 include bolts 15 for securing a strap 16 which mounts the stationary housing 11 on the pipe 17 to be cut, forcing the same into arcuate recesses 18 on the lower interior of stationary housing 11.

Within the cylindrical interior of stationary housing 11 there is provided a hollow cylindrical member 25 which has the cutting assemblies formed on the lower end thereof. At its upper end, this hollow cylindrical member 25 is connected by suitable means to a mounting member 20 which is in turn fixed to the shaft 12 for rotation therewith. In the present embodiment the cylindrical member 25 includes an upwardly extending, outwardly threaded member which is threadedly engaged in internal threads 21 of the member 20. The member 20 is then connected through a suitable pin 22 to the shaft 12. Other connecting means may be provided. For example, the member 25 may include a plate at its upper portion directly welded to a flange fixed on the shaft 12.

Referring now to FIGS. 2 through 5 as well as FIG. 1, the lower portion of cylindrical member 25 includes a plurality of cavities 26, each having a cutting assembly 35 fixed thereto. The number of cavities depends on the diameter of cylindrical member 25. Preferably, the number of cavities will range from three on a 2⅜" diameter shell cutter to sixteen on a 15½" diameter shell cutter.

Referring to FIG. 2, the cavity 26 has locating means which includes a step 27 having a groove 28 formed therein and a vertical rear portion 29 having a groove 30 formed therein.

Figure 3:
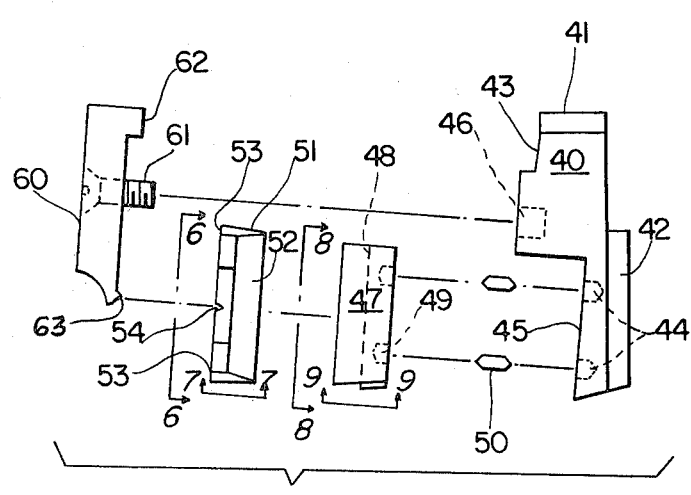
FIG. 3 is a side elevational view of the cutting assembly of FIG. 2, but with the parts separated in an exploded view to better illustrate details of the invention.
Figure 9:
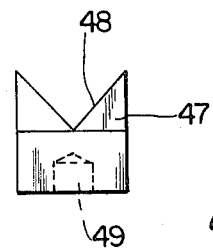
FIG. 9 is an end view of a seat, taken along line 9—9 of FIG. 3.

The cutting assembly will now be explained in greater detail with respect to FIGS. 2 and 3. A cartridge 40 includes an upper raised stud 41 which is adapted to mate with groove 28 and a rear stud 42 adapted to mate with groove 30. The cartridge also includes a step 43 adapted to receive a step 62 of a clamp 60, as to be discussed in greater detail below. The flat front face 45 of cartridge 40 includes a threaded bore 46 and a pair of dowel receiving holes 44. In practice a seat 47 will fit flat against the front flat surface 45 of cartridge 40. This seat, as shown in FIG. 3, includes a pair of dowel holes 49. In practice, with the seat 49 flat against cartridge 40, the two dowels 50 fill the dowel holes 44 and 49, thereby positively positioning the seat 47 relative to the cartridge 40 but in a removable manner. The details of seat 47 are also illustrated in FIGS. 8 and 9. Referring especially to FIG. 9, the upper, i.e. forwardly facing portion of seat 47 includes a V-shaped groove. A cutting insert 51 includes a V-shaped lower portion 52, as more clearly shown in FIG. 7, which mates with groove 48, thereby forming a locating means of the cutting insert relative to the seat. At its upper and lower ends, the cutting insert 51 includes cutting edges 53. On its forwardly facing surface cutting insert 51 includes a cross groove 54.

Finally, the cutting assembly includes a clamp 60 having a step 62, a threaded bolt 51 and a projection 63.

As is apparent in FIG. 2, in the final assembled form the seat fits flush against surface 45 of cartridge 40 with the dowels 50 positioning these elements, the cutting insert 51 fits snugly against the seat 47 with V-shaped projection 52 fitting within groove 48, and finally the clamp 60 holds all of these elements together by virtue of projection 63 engaging groove 54, step 62 engaging step 43 and threaded nut 61 threadedly engaged with bore 46.

In accordance with a preferred embodiment of the present invention, during the pre-machining stages of the cartridges, they will be left somwehat oversized relative to the thickness of cylindrical member 25. After they are brazed into the cavities, i.e. the raised studs 41 and 42 secured within grooves 28 and 30, the cartridges 40 will be machined on the inside and the outside to match the curvature of cylindrical member 25. In a preferred arrangement, the entire unit is then heat treated to 59 to 61 Rockwell C. This will make the parts hard enough to discourage cutter distortion during the cutting operation. The dowel holes and dowels are preferably ⅛" in diameter. The seats are premachined so that they are 0.350 inches in width and have an inside concave radius and an outside convex radius to match the above described curvature of the inside and outside of member 25, and now also of the cartridge 40.

The groove 48 and matching projection 52 are preferably 90°. In accordance with a preferred arrangement, the cutter inserts 51 are indexible, i.e. reversible so that each end includes a cutting edge which can be utilized before that cutting insert must be discarded.

The cutting insert can be of any suitable material, a preferable material being tungsten carbide.

The advantages of the present invention will now be apparent. If cutting inserts 51 are subjected to a sufficient force to damage them, such force will be transmitted to the seat 47 which might also break, but it is unlikely that the force will be transmitted therebeyond to the cartridge 40. Hence, elements fixed to the cylindrical member 25 will in all likelihood not be damaged, while those elements which will be damaged are those which are easily replaceable. When the cutting inserts become dull, it is a very simple task which can be performed at the job site to simply loosen the clamp and permit the cutting insert to slide out, i.e. it is not even necessary to completely remove the clamp. If appropriate, the cutting insert can simply be reversed and reinserted, or if both edges have already been dulled, a new cutting insert can be slid up into groove 48 and the nut 61 tightened down until projection 63 engages the groove 54 on the new cutting insert. Hence, replacement of cutting inserts is performed in a relatively easy manner.

Figure 10:
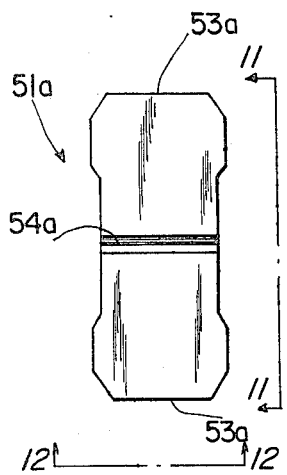
FIG. 10 is a plan view of a cutting insert, similar to FIG. 6, but showing a modified embodiment of the cutting insert.
Figure 11:
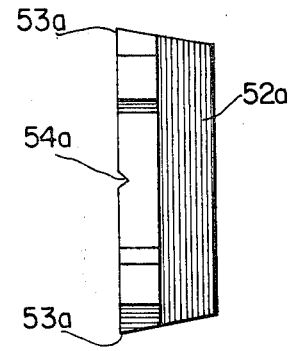
FIG. 11 is a side view, taken along line 11—11 of FIG. 10.
Figure 12:
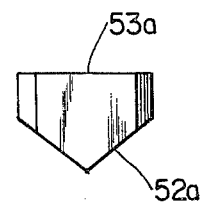
FIG. 12 is an end view, taken along line 12—12 of FIG. 10.
Figure 13:
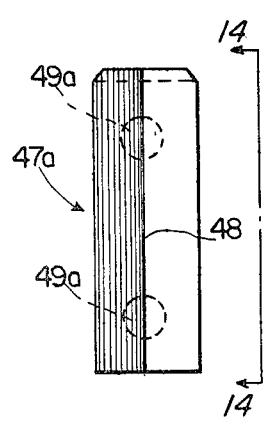
FIG. 13 is a plan view of a modified seat adapted for use with the cutting insert of FIGS. 10-12.
Figure 14:
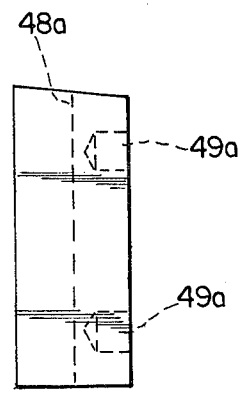
FIG. 14 is a side elevational view taken along line 14—14 of FIG. 13.

FIGS. 10 through 14 illustrate one modification of the present invention. As shown therein, the cutting insert 51a comprises a pair of straight, transverse cutting edges 53a, as contrasted to the pointed cutting edges 53 in the embodiment of FIGS. 1-9. This embodiment also includes a V-shaped bottom 52a and a groove 54a. A seat adaptable for use with the cutting insert of FIGS. 10-12 is shown in FIGS. 13 and 14. This seat 47a includes dowel holes 49a and a V-shaped groove 48a. This embodiment is quite similar to element 47 except that the uppermost end is straight across, i.e. it does not include an upwardly projecting V-shaped support for a V-shaped end 53 of the cutting insert 51.

Although the operation of the present invention will become apparent, the operation will be briefly summarized below for purposes of clarity.

A pipe to be cut into is mounted on stationary housing 11 as shown in FIG. 1. Shaft 12 is then rotated, rotating the drill bit 13 and the member 25. The shaft 12 with the elements 20 and 25 are then lowered (as shown in FIG. 1) so that cutting assemblies 35 cut into pipe 17. If this pipe 17 is formed of metal, it will be seen that the cutting assemblies at first perform a cutting action on only a small portion of their rotary travel, namely at the top of the pipe. As the shaft 12 and its connected elements move downwardly, a successive greater portion of the pipe is being cut. The fact that only portions of the pipe are being cut at any one time causes severe vibrations to be transmitted to the cutting member 25. It is for this reason that it is important that a plurality of teeth be provided so that the cutting force, or more accurately, the reaction force from pipe 17 exerted onto the cutter, is balanced. Meanwhile, the drill bit 13 serves the purpose of holding onto the generally circular section which is being cut out of pipe 17 to facilitate removal of that section.

If a cutting insert breaks or becomes dulled, it can be removed very conveniently and easily by loosening the bolt 61 enough to permit projection 63 to rise up out of groove 54. This permits cutting insert 51 to be slid downwardly out of its respective groove 48 and a new cutting insert reinserted.

Although the invention has been described in considerable detail with respect to preferred embodiments thereof, it will be apparent that the invention is capable of numerous modification and variations, apparent to those skilled in the art, without departing from the spirit and scope of the invention.

I claim:

1. A rotatable shell cutter of the type intended for cutting an opening into the curved side surface of an elongated pipe, generally transverse to the direction of elongation of the pipe, comprising:

a cylindrical member having an operative end, at least three cutting assemblies arranged in a circle at the operative end of the cylindrical member, to cut into the side of the pipe as the cylindrical member is advanced parallel to its axis, a rotatable drill bit located along the axis of the cylindrical member and rotatable therewith to drill a hole into the side of the pipe as the cutting assemblies of the cylindrical member are cutting an opening into the side of the pipe, a circumferentially extending recess formed into the operative end of the cylindrical member adjacent each cutting assembly, the side of each recess, on the trailing side thereof, taken in the direction of rotation, having first locating means therein, which first locating means is longer in the axial direction of the cylindrical member than in the circumferential direction thereof, a seat operatively mounted so as to be supported by said first locating means, said seat being elongated in a direction parallel to the axis of the cylindrical member, such that a major portion of the rear of the seat, taken in the direction of travel of the cylindrical member, is supported by the axially extending part of said first locating means, said seat being removably mounted relative to said cylindrical member, a cutting insert being elongated and having a cutting edge at the end thereof extending axially out from said operative end of the cylindrical member, the elongated trailing side of the cutting insert resting against the seat, second locating means on the insert and seat for locating the cutting insert against and relative to the seat, and a clamp having first means removably connected relative to the cylindrical member, said connection being beyond the ends of the seat and cutting insert, which ends are remote from the cutting edge of the latter, and said clamp having second means engaging the cutting insert to positively and removably position the cutting insert relative to the seat and the cylindrical member, and to secure the cutting insert and seat relative to the cylindrical member.

2. A rotatable shell cutter according to claim 1, wherein said first locating means comprises a step formed in the side of each recess of the cylindrical member and a cartridge located in each said step and formed integrally as one piece with the cylindrical member, the said seat being removably mounted on the cartridge and the first means of the clamp being connected to the cartridge.

3. A rotatable shell cutter according to claim 2, the sides of the cartridge, the seat and the cutting insert being curved, when viewed in said axial direction, in concentric circles coaxial with said axis.

4. A rotatable shell cutter according to either of claims 1 or 2, each cutting insert having two cutting edges, one at each end, wherein only one is in position for cutting at any given time.

5. A rotatable shell cutter according to claim 2, the sides of the cartridge, the seat and the cutting insert being curved, when viewed in said axial direction, in concentric circles coaxial with said axis, each cutting insert having two cutting edges, one at each end, wherein only one is in position for cutting at any given time.

6. A rotatable shell cutter according to any one of claims 1 or 2, the cutting insert and seats having a cooperating V-shaped projection and recess extending parallel to the cylindrical member axis.

7. A rotatable shell cutter according to claim 6, the clamp and cutting insert having a corresponding projection and groove extending orthogonal to said cylindrical member axis for positively positioning the clamp and cutting insert together, and means for removably securing the clamp relative to the cylindrical member.

8. A rotatable shell cutter according to claim 7, the projection formed on the clamp, and its corresponding groove formed on the top of the cutting insert.

9. A rotatable shell cutter according to claim 6, wherein the V-shaped projection is on the bottom of the cutting insert, and its corresponding recess is formed in the top of the seat.

10. A rotatable shell cutter according to claim 2, including a dowel means for positively positioning the seat and cartridge relative to each other.

11. A rotatable shell cutter according to claim 2, comprising a dowel and corresponding recesses in the cartridge and seat, both engaging the dowel, for positioning the seat relative to the cartridge, an axially extending groove and recess formed one on the seat and one on the cutting insert for positioning the seat and cutting insert relative to each other, a corresponding projection and groove formed on the cutting element and clamp and extending orthogonal to the said axis for positively positioning the clamp relative to the cutting insert, and means for securing the clamp directly to the cartridge such that it exerts pressure through the projection and groove to force the clamp, cutting insert, seat and cartridge together.

12. A rotatable shell cutter according to claim 10, wherein the V-shaped projection is on the bottom of the cutting insert and the V-shaped recess is formed in the top of the seat, and wherein the said orthogonal projection is formed on the clamp, and its corresponding groove is formed on the top of the cutting insert.

* * * * *